Jan. 22, 1963    S. FÜRST    3,074,659
METHOD AND APPARATUS FOR THE STARTING OF
COIL WINDING OPERATIONS
Filed Jan. 31, 1961    5 Sheets-Sheet 1

United States Patent Office 3,074,659
Patented Jan. 22, 1963

3,074,659
METHOD AND APPARATUS FOR THE STARTING OF COIL WINDING OPERATIONS
Stefan Fürst, Monchen-Gladbach, Germany, assignor to Walter Reiners, Monchen-Gladbach, Germany
Filed Jan. 31, 1961, Ser. No. 87,482
Claims priority, application Germany Oct. 4, 1954
35 Claims. (Cl. 242—27)

My invention relates to the winding of coils or bobbins of yarn for textile purposes and particularly to a method and means for starting the winding of a pirn, cop, quill or other bobbin after the completion of a previously-wound bobbin, preferably on automatically operating coil winding machines, for example as shown and described in my Patent No. 2,657,867, issued November 3, 1953 and assigned to the assignee of the present invention.

This application is a continuation-in-part of my copending application, Serial No. 538,234, filed October 3, 1955, now abandoned.

In coil winding operations as occurring in automatic winding machines, an empty core is supplied to a winding station whenever a coil previously wound is completed. Particular care must be taken to have the end of the yarn on the completed coil, before being severed, remain firmly connected with the empty core newly supplied, until at least the first few turns of yarn have run onto the core so that the yarn can hold itself on the core.

For this purpose, according to conventional practice, the yarn end is clamped between bobbin core and spindle head and is thus held in clamped condition until the winding of the bobbin is completed. Thereafter, the relatively long end of yarn of the first layer of turns remains attached to the bobbin as a "tail." During the further use of the bobbin, for instance in the shuttle of a weaving loom, the tail may become extremely troublesome because it may considerably interfere with the proper running of the yarn from the coil. It has been proposed, therefore, to clamp the starting end of the yarn to the spindle head and to employ a revolver head with several spindles of which only one at a time is connected with the winder drive. Each fully-wound bobbin is then kept on the revolver at least until the new bobbin core is placed into the winding operation. The removal of the full bobbin from the revolver is then effected by a subsequent operation. Such a device is intricate and, aside from requiring a number of mechanical control means, is also too large as the turning of a revolver structure requires considerable space which in such machines is at a premium because it is needed for other mechanism parts that must be located at the winding station to cooperate with the winder spindle. Thus, when providing a revolver structure, the thread guide cannot run closely adjacent to the coil being wound. The revolver structure also obstructs the space best needed for the displacing device for actuating the thread guide to make the incoming thread travel back and forth along the body of yarn being wound. Consequently, the advantage of a shortened yarn "tail" at the beginning of a coil, obtainable with coiling units having such a revolver structure, results in considerable disadvantages in other respects.

It is an object of the present invention to eliminate the above-mentioned disadvantages of long yarn ends at the beginning of a bobbin while also avoiding the disadvantages inherent in machines equipped with revolver structures of the kind described.

To this end and in accordance with my invention I provide a novel method for starting the winding operation. That is, in coil winding machines that automatically, or partially automatically, change from a full coil to an empty coil core, the starting of the coil winding operation is effected by clamping and simultaneously severing the yarn when changing from a full to an empty coil.

This makes the application of the revolver mechanism superfluous. The yarn can no longer tear at any location but is always severed at a predetermined point. This is particularly advantageous with coil winding machines in which the coil changing operation is accompanied by an ejection of the full coil from the coil holding device. Indeed, the combined clamping and severing operation can even be directly combined with the supplying of the new coil core or with the removal of the full coil by having the core supplying operation occur directly ahead of the combined clamping and severing operation and by having these operations occur simultaneously with the ejection of the full coil. The clamping operation may be effected only temporarily and may be terminated as soon as a few turns of yarn are located one above the other upon the coil core next to be wound, thus making a further clamping of the yarn end unnecessary. For then releasing the temporarily clamped yarn end, the movement of the coil during the winding operation may be utilized. This can be done, for instance, by having the clamping operation released under the effect of centrifugal force acting upon a weight mounted upon the winder spindle.

According to another feature of the invention, a stored amount of yarn is formed between the yarn supply and the clamping location, perferably between the body of yarn that supplies the yarn to the winding machine, on the one hand, and the thread guide of the winding machine on the other hand. This stored amount of yarn is formed during the coil changing operation and is available at the moment when the next winding operation is started, so that one or more turns of yarn are first placed about the coil core before the stored amount is consumed. This has the result of preventing that, when starting a new coil, the sudden pull imposed upon the yarn can produce an excessive tension that may cause breaking of the yarn or may force the yarn end out of the clamping connection with the spindle head. In other words, the provision of a small amount of stored yarn during coil changing has the effect of placing the stored amount under such a slight pulling tension that the yarn cannot droop but, on the other hand, cannot be torn by friction and hence is kept under tension only to the amount needed to hold it sufficiently taut. During the starting of the next winding operation, the stored amount of yarn is available to form the beginning of the first few winding turns and is sufficient to make the yarn hold itself fast upon the coil core until the incoming yarn has been wound over the first few turns and has tightened them against the core under the slight pulling effect of the yarn. On the other end, the tension in the thread being wound does not increase abruptly but rather at a sufficiently low rate to eliminate the danger of breaking the thread due to starting impact.

The apparatus for performing the starting method according to the invention is equipped with a device for the simultaneous severing and clamping of the yarn, this device being located in the vicinity of the spindle head and preferably on the spindle head itself. For passing the yarn toward and into this severing and clamping device, the spindle head may be provided with stationary or moveable thread guiding means which shift the thread toward the clamping place, for instance from the control members that effect the coil change.

According to another feature, stationary thread guiding means are disposed in the vicinity of the spindle head to direct the supply of yarn to the proper clamping and severing location.

In order to terminate the clamping operation at the proper moment, it is of advantage to make the clamping member subject to the effect of an operation which commences after the starting of the spindle and which moves or lifts the clamping member after the rotation of the spindle head has accelerated to the proper speed. To this end, and in accordance with another feature of the invention, a weight or mass subjected to centrifugal force is mounted on the clamping member and causes the clamping member to be released when the spindle head has reached a given speed of revolution.

According to still another feature of my invention, I provide the spindle head with a device which stops the spindle head always in a predetermined rotational position so that the severing and clamping member mounted on the spindle head will always occupy the correct position when the spindle is at standstill and when the coil is being exchanged.

According to another feature of the invention, the severing and clamping device is moved out of the range of the incoming yarn after termination of the severing operation so that then the coil core can be supplied with yarn over its entire length without being obstructed by the severing and clamping member.

As mentioned above, I preferably provide for a temporary accumulation of thread material just ahead of the winding location to reduce the tension at the commencement of a winding pass. According to a more specific feature relating to this aspect of the invention, I provide, immediately ahead of the winding location, a device for forming a loop of yarn, which device comprises a yarn guiding means composed of two bridge portions and a hook-shaped member. The hook member passes between the two bridge portions and is subjected to force so as to pull the yarn between the bridge portions. In this manner, the thread forms the desired loop before reaching the thread guide of the coil winding mechanism proper, and the winding is thus begun without tension in the yarn.

The force normally acting upon the hook-shaped member may not alone suffice for forming the loop. According to another feature of the invention, therefore, a pusher is caused to act during the coil changing operation either directly upon the yarn or upon the hook-shaped member, thus forming the loop either directly or with the aid of the hook-shaped member. In this manner, the hook-shaped member is securely moved into the position that corresponds to the tautened thread. The pusher is placed under the action of a force, for instance spring force, so that it remains in the pushed-out position until the pull subsequently imposed upon the thread when the winding is started, is active to force the pusher back into the position corresponding to the stretched course of the yarn being supplied.

These and other objects and features will be apparent from the embodiments described below with reference to the drawings in which.

In the following description reference will first be had to the embodiment and its various modifications illustrated in FIGS. 1 through 18.

Figure 1:
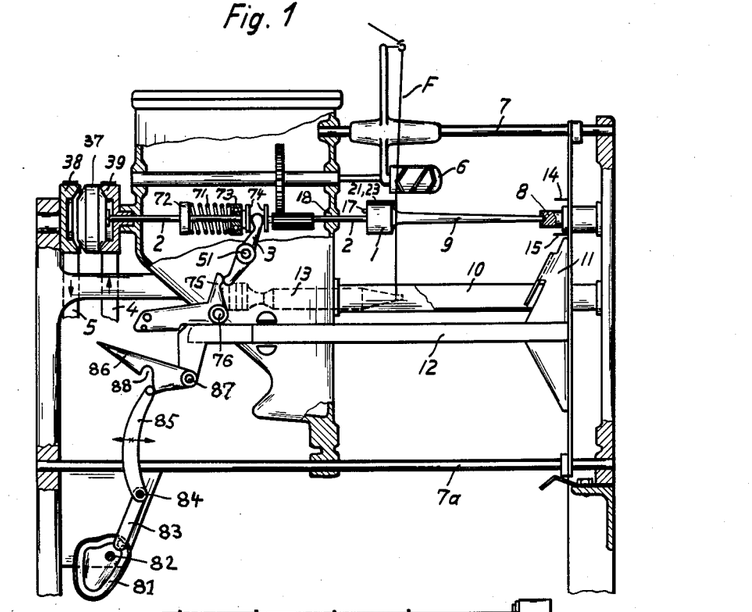
FIG. 1 shows schematically a front view of a winder unit.
Figure 2:
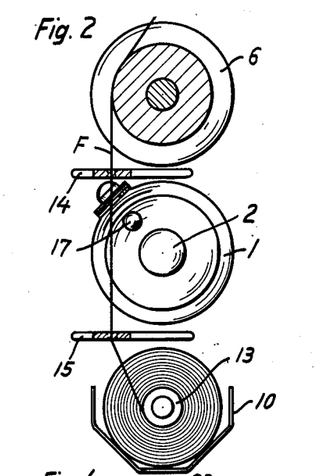
FIG. 2 is a side view, seen from the right of FIG. 1 and shown partly in section, of the thread guide, the spindle head, and an ejected full bobbin.
Figure 3:
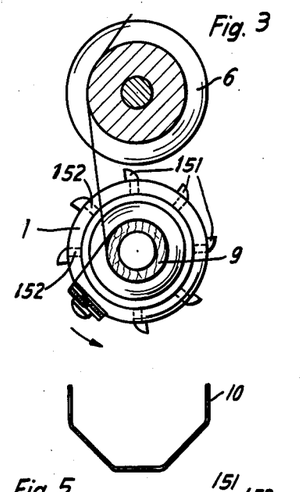
FIG. 3 shows the same devices as FIG. 2 but at a moment shortly after the starting of a new bobin coil.
Figure 4:
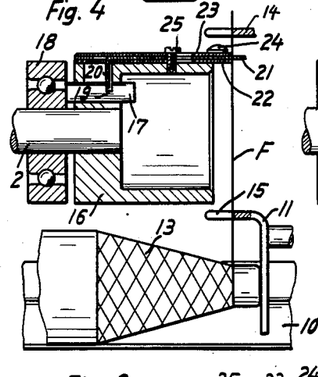
FIG. 4 is a part-sectional view of an empty spindle head and of a fully wound bobin corresponding to the illustration in FIG. 2.

In each coil winding unit, the spindle head 1 (FIGS. 1, 10) is driven by a shaft 2 which can be coupled, under selective control by a lever 3, either with a belt drive 4 or with a belt drive 5. Belt drive 4, when in operation, revolves the spindle shaft 2 in the normal coiling direction at the desired operating speed, whereas belt drive 5, when operative, revolves the spindle shaft 2 in the reverse direction at slow speed, as will be more fully explained in a later place. A grooved thread guide 6 is displaceably mounted on a rod 7 and takes care of shifting the thread F back and forth during the coil winding operation. A coil or bobbin core 9 is shown inserted between the spindle head 1 and a counter bearing 8 (FIG. 1). When the bobbin core 9 is filled up with a coil of thread, the core 9 is released by counter clockwise rotation of the control lever 3 which moves the spindle head 1 toward the left and away from the counter bearing 8. The released full bobbin 9 then drops into a trough 10 (FIGS. 1 to 5.) A pusher 11 (FIGS. 1, 4), located at the end of trough 10, is connected with a slide rod 12 (FIG. 1). When slide rod 12 is moved toward the left by the control mechanism of the coil winding machine, the pusher abuts against the full bobbin 13 and shoves it into the position shown in FIG. 1 by broken lines. As a result, the thread F is moved, from the right, against the spindle head 1, and thus is placed within the operating range of a clamping-cutting device 21, 23 (FIGS. 1, 4 to 7). The thread F may be properly directed by means of a thread guiding member 14 (FIGS. 2 and 4). This member is located above the spindle head, but a second thread guiding member 15 may be provided below the spindle head.

The thread guiding members 14 and 15 are attached to the pusher 11 and enter into engagement with the thread F when the pusher 11 is being shifted to the left (FIG. 1).

Figure 5:
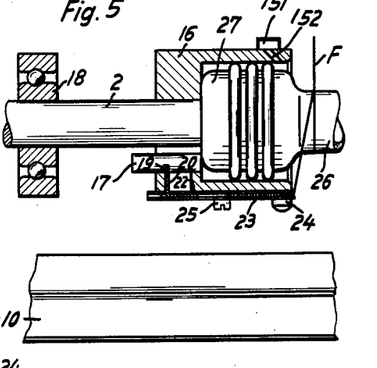
FIG. 5 shows a view similar to FIG. 4 but in the same operating condition as in FIG. 3, one turn of the coil being started on a new bobbin.
Figure 6:
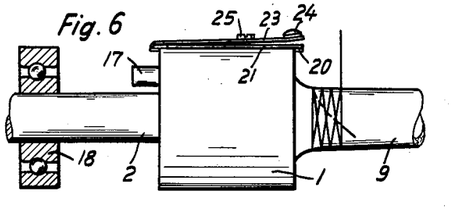
FIG. 6 is a view similar to that of FIG. 5 but shown shortly after a few turns have run onto the bobbin core.
Figure 7:
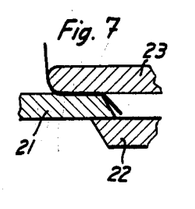
FIG. 7 is a sectional view on a larger scale of the pinching and cutting device of the spindle head, the spindle head being in the position shown in FIGS. 4 and 6.
Figure 17:
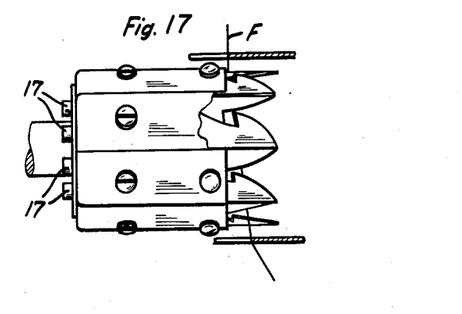
Figure 18:
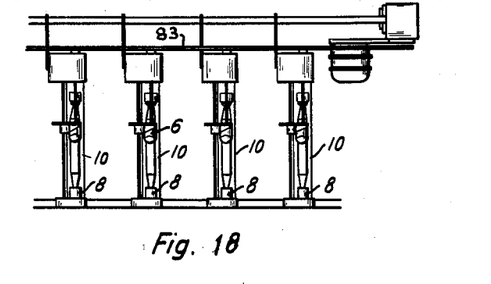
FIG. 18 is a schematic top view of a coil winding machine with a plurality of coiling units, each designed and operative in accordance with the unit according to FIG. 1.

The spindle head 1 consists essentially of a cup-shaped structure 16 (FIGS. 4, 5) in whose bottom an ejector pin 17 is displaceable parallel to the spindle shaft 2. During coil changing operation the shaft 2 is pulled toward the left (FIG. 1) a sufficient distance to have the exterior side of the cup bottom nearly abut against the fixed bearing 18 of the shaft (FIG. 4). As a result, the ejector pin 17, abutting against the bearing 18, is pushed forward into the cup space (FIG. 4). The ejector pin 17 has a transverse groove 19 engaged by a lug 20 of a cutter blade 21 (FIGS. 4, 5). Located opposite the cutter blade 21 is a counter blade 22 (FIGS. 4 to 7). The shapes of blades 21 and 22 are shown in FIG. 17. A leaf spring 23 bears against the outside of the cutter blade 21 to provide the necessary cutting and clamping pressure. The spring 23 is somewhat under tension when the cutter blade 21 is in the inactive position. Mounted on the leaf spring 23 is a weight in form of a button 24 to provide for sufficient mass and inertia. The three members 21, 22, 23 are held together by a screw 25 (FIGS. 4, 5, 6). They are so guided by means of slots that, when the lug 20 performs its return movement relative to the cup 16 from the position of FIG. 4 to the position of FIG. 5, the cutter blade 21 is first moved back from the cutting position, longitudinally of the spindle, and that, after cutting of the thread between the shearing edges of the blades 21 and 22, not only the cutter blade 21 but also the counter blade 22 and the clamping spring 23 participate in the return movement. Immediately subsequent to the cutting of the thread, the end of the thread leading to the coiling spindle is pinched and clamped between the members 21 and 23. Member 23 is lifted during rotation of the coil after the coil has reached a given speed of rotation. The clamping effect then ceases, and the yarn pulls itself out of the clamping place. The actuation of the knife 21 then takes place.

When toward the end of the coil-changing operation the shaft 2 is shifted from the left position according to FIG. 4 into the right position according to FIG. 5, the ejector pin 17 passes from its right position (FIG. 4) to its left position (FIG. 5). Before the spindle shaft 2 is thus shifted from left to right, a new bobbin core 26 is supplied to the spindle head by means of core supply means (not illustrated). The head 27 of the new bobbin core 26 then lies exactly opposite the opening of cup 16. Due to the displacement of the spindle shaft 2 toward the right, the ejector pin 17 bears against the front face of the bobbin core head 27, and during the continuing shifting of the shaft 2 toward the right is forced toward the left toward the bottom of the cup 16. During this movement of pin 17, it entrains the lug 20. Consequently, the blades 21 and 22 as well as the clamping spring 23 participate in the movement of pin 17 to such an extent that the front edge of the clamping and cutting devices lies approximately flush with the front face of the spindle head 1.

Figure 8:
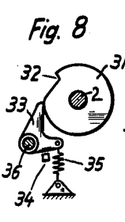
FIGS. 8 and 9 show side views in respectively different operating positions.
Figure 9:
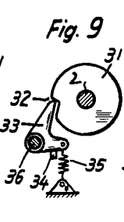
Figure 10:
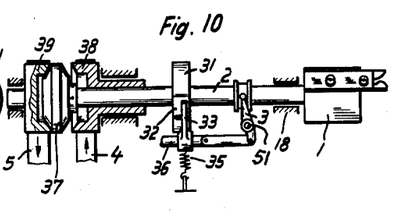
FIG. 10 shows a front view of a device for arresting the spindle shaft in a given starting position, this device forming part of the machine illustrated in FIGS. 1 to 7.

Mounted on shaft 2 behind the bearing 18 (FIG. 10) is a device for returning the spindle shaft to a given position. This device comprises a cam disk 31 firmy connected with shaft 2 and provided with a single cam notch 32 (FIGS. 8 to 10). Located opposite the disk 31 is an angular lever 33 mounted on a pivot pin 36 and biased by a spring 35 in the direction toward a fixed stop 34. During rotation of control lever 3 about its pivot 51, the pivot shaft 36 of the angular lever 33 is shifted parallel to the axis of spindle shaft 2 so that the angular lever 33 can cooperate with the cam disk 31 only when the spindle shaft is in the illustrated position, that is when the spindle head 1 is displaced toward the left. This is the case when the coiling unit is in coil-changing position which is the normal stopping position.

Firmly mounted on the left-hand end of spindle shaft 2 is a member 37 of a friction clutch (FIGS. 1, 10) selectively engageable with respective clutch members 38 and 39. Member 39 forms a belt sheave and is driven by the belt drive 4 to operate the spindle 2 at normal speed in the proper coiling direction during winding operation. Clutch member 38 forms a belt sheave for the belt drive 5 and when in engagement with the clutch member 37 drives the shaft 2 slowly in the reverse direction. The friction clutch permits slipping between the two clutch members that are in clutching operation at a time. Consequently, when the angular lever 33 drops into the notch 32 of cam disk 31, the clutch member 37 and the shaft 2 are arrested while the driven clutch member 39 is permitted to slip relative to member 37. The position of shaft 2 thus to be fixed by the arresting device is so chosen that the clamping-cutting members 20 to 25 with the thread guiding members 14 and 15 are in proper position relative to the thread so that the thread, guided by members 14 and 15, always encounters the clamping-cutting devices in the correct position.

Figure 11:
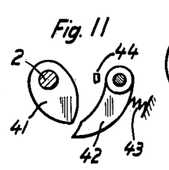
FIGS. 11, 12 and 13 show a modified design of a device for arresting the spindle shaft in a given starting position, these illustrations being otherwise comparable with FIGS. 8 to 10 respectively.
Figure 12:
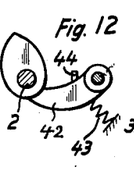
Figure 13:
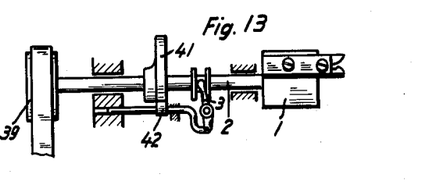

The modification of the shaft-positioning device shown in FIGS. 11 to 13 performs the same operation as the device of FIGS. 8 to 10 with the aid of different means. Instead of the cam disk 31, an eccentric cam piece 41 is firmly joined with the shaft 2. Instead of the latching lever 33, a guiding lever 42 is provided. Lever 42 is subjected to force only during the control operation and then bears against cam piece 41 so as to turn it counter clockwise from the position shown in FIG. 11 to the position shown in FIG. 12, thus returning the shaft 2 to a definitely predetermined position regardless of whether the lever 42 acts upon the right-hand or left-hand side of the cam curve of piece 41. Also in this modification, the switching movement of the control lever 3 is utilized for lifting the guiding lever 42 from cam piece 41 as soon as the spindle shaft 2 is set in rotation, while forcing the guiding lever 42 against cam piece 41 is soon as the spindle shaft 2 is shifted into coil-changing position or is at rest. The force thus acting upon the lever 42 may be transmitted through a pressure spring 43 one end of which bears against the lever 42 while the other end is connected by a suitable connecting rod or mechanism with the control lever 3. A stationary stop 44 prevents excessive movement of the forcing lever 42.

Figure 14:
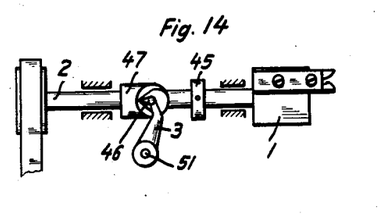
FIG. 14 shows a third embodiment of a device for arresting the spindle shaft.

In the modification of the shaft setting device according to FIG. 14 the control lever 3 simultaneously acts as a forcing lever similarly to lever 42 in the modification described with reference to FIGS. 11 to 13. The control lever 3 (FIG. 14) is mounted on its shaft 51 and is provided with a prismatic nose 46 which bears against a cam piece 47 on shaft 2 and thus returns shaft 2 into a position determined by the angular position of the cam. For switching the spindle shaft 2 to normal run in the coiling direction, the lever 3 is turned clockwise. The back of the nose 46 then abuts against a collar 45 which shifts the shaft 2 into the forward-run position.

Figure 15:
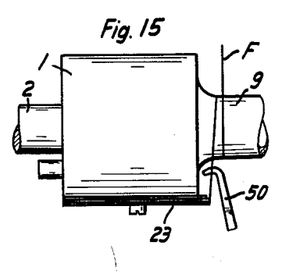
FIG. 15 illustrates schematically a modified embodiment of the device for removing the pinched thread from the clamping device.

In the modification according to FIG. 15, the clamping spring 23 is not provided with a weight (24 in FIGS. 4, 6) so that, during rotation of spindle shaft 2, the spring 23 cannot automatically lift itself off the cutter blade. For releasing the thread from clamping engagement, a hook-shaped part 50, under control by any suitable speed sensing device, is placed between the bobbin core and the clamping-cutting device and then at the desired rotational speed of shaft 2 pulls the clamped end of the thread out of the clamping engagement.

Figure 16:
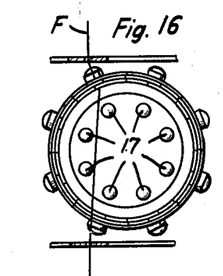
FIGS. 16 and 17 show a side view and a front view, respectively, of a modified spindle head provided with a plurality of clamping-cutting devices, applicable in a machine otherwise designed in accordance with the preceding figures.

In the modification according to FIGS. 16 and 17 the above-described single clamping-cutting device is substituted by a plurality of such devices, each having its own ejector pin 17. With such a multiple device it is not necessary to return the shaft into a given position while the thread is being supplied to a new bobbin core to be wound. This is because with such a design the thread will always meet at least one of the clamping-cutting devices and thus will be firmly held by that device and will be cut also by operation of the device.

The over-all operation of a coil-winding unit as described in the foregoing is as follows.

Assume that a bobbin is completely wound, that the thread F being supplied has been severed and that its end is clamped as described in the foregoing. Immediately thereafter the spindle shaft 2 is set in revolution in the coiling direction by the action of clutch members 37 and 39 (FIG. 1). The first turns of the coil now being wound onto a new, empty core 26 occur adjacent to the core head 27 (FIG. 5), and distribute themselves over the vicinity of the core head as shown in FIG. 6. While these first few turns are being wound onto the bare core the severed yarn end remains clamped. Due to the increased speed of rotation, the weight 24 and the clamping spring 23 then fly outwardly so that the clamping effect is eliminated. The tail end of the yarn is flung outwardly due to centrifugal force and flutters as it is whipped about by the whip-lash action created by the rapidly rotating bobbin head. The thread being wound onto the core now passes repeatedly along that tail end so that the tail is slowly coiled into the winding being built up on the core. The further coil-winding operation is the same as in the known machines.

When the bobbin is completed, it is discharged in the above-described manner by withdrawal of the spindle shaft 2 toward the left. The pusher 11 on control bar 12 is effective to shift the discharged full bobbin into trough 10 toward the left, and the end of the thread is then cut and clamped in the above-described manner. Thereafter a new bobbin core is supplied and is held in coiling position by the spindle shaft 2 returning into the operative position. The cycle of operations is then repeated.

It will be recognized that by virtue of the above-described method and devices, the tail end of the thread occurring at the beginning of each new bobbin is kept very short and is liberated from the clamping device during the initial stages of the winding operation so that the tail is tied into the winding being wound. Consequently the bobbin when completed, does not have a tail which hangs out of the winding in the vicinity of the core head and which must either be cut away by a separate step of operation or, when such a step is omitted, may result in trouble, such as interference in a weaving-loom shuttle with the yarn running off the preceding bobbin.

In principle, the present invention concerns itself primarily with having the yarn F, which leads from the supply coil to the filled bobbin 13, fastened at the next empty core 9 to be wound. This purpose is served by the yarn-catching device which seizes the yarn end, severs it by tearing from the completed bobbin 13 and holds it fast until a sufficient number of turns are wound onto the new core or pirn 9 so that when this yarn end F is released, the yarn can no longer be pulled off the filled bobbin 13. Since the remaining yarn end fastened at the foot of the core 9 is rather short, it does not cause any disturbance and for that reason need not necessarily be eliminated. During practical tests of the invention, however, it has been found that, due to the fluttering motion of this short yarn end, the yarn end is usually caught by the oncoming yarn F and is wound beneath the first few winding convolutions passing onto the core 9 so that practically no trailing yarn end remains at all. Although this winding-under of the yarn end is not absolutely necessary, it has resulted in some advantage. In order to obtain this advantage with any and all kinds of yarn that may be wound on the machine, an air current is preferably provided which blows axially of the yarn so that it can always reliably be caught by the oncoming yarn. It is simple for one skilled in the art to determine by a simple test as to which particular yarns will cause the yarn end to place itself automatically beneath the first few starting turns without using an auxiliary air current. This depends upon the type of yarn and also upon the pretreatment of the yarn. However, the question of whether or not the yarn end is wound beneath the starting turns is not of decisive significance for the utility of the device, and the particular conditions under which a reliable winding-under takes place can be readily adapted to suit the particular yarns to be wound. The machine and bobbins produced thereby with any type of yarn can be used even if it is left entirely to chance whether or not the yarn end is wound under the initial turns, although for heavier yarns, as above mentioned, it is preferable to provide an auxiliary air current, such as by impeller 151 of FIGS. 3 and 5, to always secure such underwinding.

The control devices for actuating the control lever 3 and the control bar 12 (FIG. 1) at the proper time, for instance whenever a bobbin is completed, may be identical with the control devices of known coil-winding machines, particularly with those used in the automatic pirn winders and quillers manufactured and sold by applicant's assignee in this country and abroad under the trade name "Autocopser." However, though these control devices are not novel and do not form part of the invention proper, a brief description thereof will be given in the following with reference to FIG. 1.

The control lever 3 and the spindle shaft 2 according to FIG. 1 are normally held in the illustrated positions by means of a helical pressure spring 71 which bears against a stationary abutment 72 and acts through a ball bearing 73 against a shoulder member 74 mounted on shaft 2. The spring 71 thus operates to normally couple the shaft 2 by clutch members 37, 39 with the forward drive 4 for coil winding operation. For releasing a completed bobbin and starting a coil changing operation, the control lever 3 is forced counter clockwise about the pivot 51 by means of an angular lever 75 pivoted at 76. The actuation of lever 75 is effected through cam means (not shown) mounted on the control bar 12, and this actuation occurs near the beginning of the shifting movement of bar 12 from the illustrated position toward the left.

The just-mentioned shifting of control bar 12 comes about as follows: A single cam 81 mounted on the frame structure of the multi-unit machine (see FIG. 18) is driven at a uniform rate of rotation independently of the speed of the coil-winding operation. Cam 81 mounted on a cam shaft 82 acts through an arm 83 to apply a continual rocking movement to a rocking shaft 84 which extends along all winding units of the machine. Each of the individual units is equipped with a long "sword" member 85 seated upon the rocking shaft 84. When the bobbin is full, the control bar 12 in this particular winding unit is locked to the sword member 85 and then travels with it for one back and forth movement. The locking action is effected by means of a latch pawl 86 which is pivoted at 87 to the control bar 12, but is normally disengaged from the sword member 85. A feeler mechanism (not illustrated), responsive to the completion of the bobbin, causes the latch pawl 86 to be temporarily turned downward so that the notch 88 of pawl 86 enters into engagement with a pin and sword member 85. As a result, the positive connection between sword member 85 and control bar 12 is established. The control bar then follows the reciprocating movement of the sword member 85 for one complete reciprocation. Thereafter the pawl member 86 is released from sword member 85. In this manner, all operations are initiated and fully controlled by the automatic feeler mechanism although, if desired, the cycle of coil changing operations may also be initiated by manual actuation of the pawl 86. Suitable feeler mechanisms for controlling a coil changing operation upon completion of a bobbin or in response to the occurrence of thread breaks or other faults are described, for instance, in Patent No. 2,716,004 of W. Reiners and S. Fürst and in the copending application of W. Reiners and S. Fürst, Serial No. 227,553, both assigned to the assignee of the present invention. However, as mentioned above, the particular design and operation of such feeler mechanisms and of the particular manner and means applied for having them act upon the coil changing and thread clamping and cutting devices according to the invention, is not essential to the invention proper and may be modified in any desired respects.

According to another feature of the invention, the objective of clamping and severing the thread can also be met by fixing the thread temporarily at two points and producing a relative movement between these two points, thus severing the thread by tearing it apart. A sharp edge may be provided between the two points of fixation. Then, the stress imposed upon the thread at the location of the edge during the relative movement is particularly great so that the thread will be severed at that edge and hence at the most desired location.

The fixation of the thread, at least at the tail end of the thread wound upon the completed bobbin, may be effected by having the clamping means act directly on the thread. However, according to another feature of the invention, the completed bobbin itself may be held fixed so that, as a consequence, the thread is likewise kept fixed. The fixation of the bobbin or of the thread may be released directly after tearing of the thread because this is the only purpose of the fixation. That is, the bobbin, after the thread is torn, can be released from its clamped position or, if the tail end of the thread is clamped directly, this tail end may be released immediately upon tearing of the thread; and the completed bobbin may then be discharged. Thus the clamping of the yarn ends is temporarily limited. As soon as the new bobbin has commenced being wound, it is preferable to release the starting end of the new bobbin so that this end, extending away from the bobbin head, can be coiled into the winding of yarn now being wound upon the core, as described above with respect to FIG. 6.

The two embodiments of the invention illustrated in FIGS. 19 to 23 incorporate the just-mentioned features and are applicable in a coil winding machine otherwise in accordance with the one described with reference to FIGS. 1 to 20.

Figure 19:
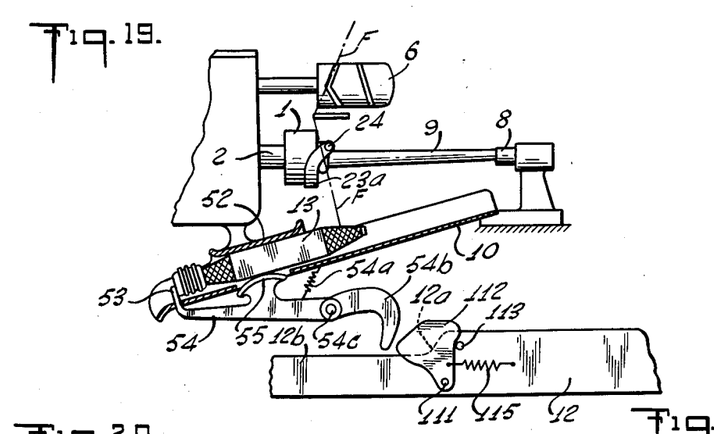
FIG. 19 shows a partial front view of an embodiment according to the invention in which a completely wound bobbin is clamped in position in order to effect severing of the thread by tearing.

In FIG. 19 a lever arm 54b is shown connected with the lever arm 54 in such a manner that when the lever arm 54b moves, the lever arm 54 also moves about the pivot axis 54c. The lever arm 54 and the lever arm 54b may be integrally built to constitute a unitary double lever pivotally rotatable about the axis 54c. For space reasons, however, it is preferable to make 54c as illustrated in FIG. 19, to consist of a torsionally stiff shaft, i.e. a shaft which when turned at one end will equally turn at the other end. Then, one end of this stiff shaft 54c carries the lever arm 54, fixed thereto, and the other end has the lever arm 54b. The shaft 54c itself is pivotally journalled in bearings (not shown). The free end of the lever arm 54b is in operative connection with the control rod 12.

The control rod 12 is provided with a step or shoulder 12a in the active range of the cam segment 112. The cam 112 is rotatably mounted about the axis 111 and is pulled by the spring 115 against a stop 113 on the control rod 12. The illustrated position of rod 12 corresponds to the starting position as illustrated, for example, on the left-hand side of the diagram illustrated in FIG. 7 of U.S. Patent 2,657,867 of S. Fürst, issued November 3, 1953.

The operation of the device of FIG. 19 is as follows:

When a bobbin is completely wound and is ejected in the manner described above, the bobbin drops into the trough 10 and is received in a tunnel 52. When sliding downward through the tunnel, the bobbin head strikes against a stop 53 of lever 54. During coil changing operation and under control by the coil changing devices, a clamping body 54 whose other end carries the stop 53 is moved upwardly as further described below. A rounded clamping cheek 55 of body 54, entering through an opening in the tunnel structure, then presses against the bobbin 13 and thus holds the bobbin and hence also the thread F in fixed position.

In the meantime and as described with reference to the preceding embodiments, an empty bobbin core 9 is placed between the spindle head 1 and the counter socket 8. It will be remembered that the spindle head 1 for releasing the previously completed bobbin was moved toward the left. As soon as the empty core 9 is in the proper position, the spindle head 1 is moved toward the right so that the core head is seized by the spindle head. The previously completed, full bobbin, which has previously dropped into the trough 10, has now reached the position shown in FIG. 19 either by sliding downward along the trough 10 or by actuation of the above-described pusher 11 (see FIG. 1).

In this stage of operation the thread guide 6 has returned to the spindle head 1 as shown in FIG. 19. Consequently, the thread F is now located immediately in front of the spindle head 1. The thread guiding member 14 brings the thread F into the position favorable for its insertion into the clamping member 23 or may even pull the thread into the clamping member. The clamping member 23 consists of a leaf spring which rests against the periphery of the spindle head. Mounted on the free end of the clamping spring 23 is a weight 24 to provide for sufficient mass. During rotation of the spindle head 1 the weight 24 is flung outwardly by centrifugal force and thus releases the clamping of the thread. Consequently, when the spindle head 1 commences to revolve, the thread F is at first held by means of the clamping spring 23 (FIG. 6) in the vicinity of the spindle head; but when the full speed of revolution is attained, the centrifugal weight 24 forces the clamping spring 23 outwardly so that the tail end of the thread is released and is coiled into the winding by the yarn running onto the core. The mechanism for accomplishing the above operates as follows.

At the beginning of the coil-exchanging operation, the control rod 12 first moves toward the left. This lifts the lever arm 54b and lowers lever arm 54. The lowering of the lever arm 54 is sufficient so that the coil 13 is not only liberated from the clamping action of edge 55 and tunnel roof 52 but the holder portion 53 of the lever arm 54 simultaneously is removed from the end to let the coil 13 glide downwardly down chute 10. Thereafter, the cam follower 54b glides on the upper edge of cam 112 a distance straight ahead to move arm 54 counter clockwise and retain it in position for a time long enough for the coil 13 to be removed out of the clamping range.

As control rod 12 continues its motion toward the left, lever arm 54b leaves the cam 112, and drops slightly under the action of spring 54a until it glides along the upper face of the control rod 12. At that moment, i.e. as arm 54b drops, the holder portion 53 of the lever arm 54 has already turned into the gliding trough sufficiently to form a stop for the subsequent just completely wound coil 13, to keep it from gliding down out of the trough, but the coil is not yet clamped fast by edge 55. In other words, the coil dropping into the gliding trough 10 thus passes without hindrance between the clamping cheeks 52, 55, but is retained by end 53 of lever arm 54.

The lever 54, 54b remains in this latter position until the control rod 12 is again moved toward the right. However, in order to prevent loosening of the holder portion 53 by the cam segment 112 striking member 54b to rotate lever 54, the lever 54b is not lifted onto the cam 112 during motion of the control rod 12 toward the right. Instead, the lever 54b turns the cam 112 about the axis 111 counter clockwise toward the left in opposition to the force of spring 115. Lever 54 is thus not further dropped and the latching effect at 53 is not eliminated. Shortly before the control rod 12 reaches its right-hand limit position, the follower arm 54b, biased in a clockwise direction by the spring 54a, passes to its lowermost position over portion 12b of rod 12. Spring 54a pulls the lever portion 54 upward so that the coil 13 is clamped fast between the cheeks 54 and 55. Since immediately thereafter the winding station commences to operate and core 9 begins to rotate, the yarn F is torn and severed in the desired manner.

Figures 20, 21:
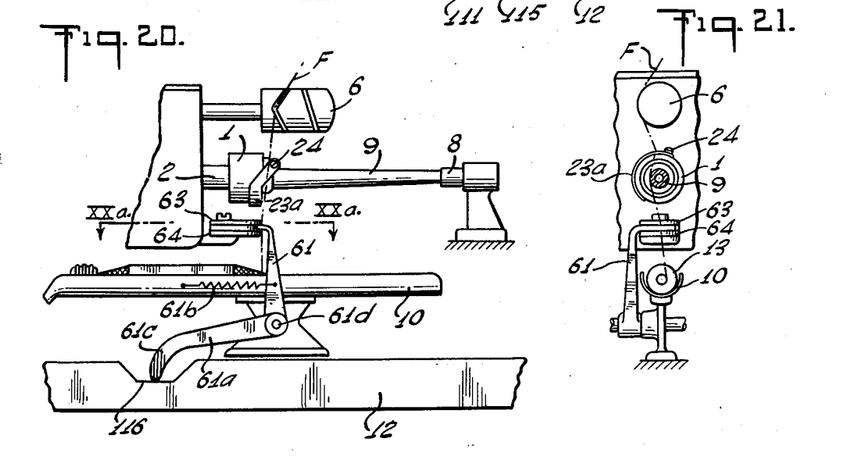
FIG. 20 is a similar front view of another embodiment in which the thread is clamped between the fully wound bobbin and the spindle head in order to effect tearing of the thread.
FIG. 21 is an end view of the device of FIG. 20.

In the embodiment of FIG. 20 the completed bobbin is not subjected to clamping. Instead, the thread F is held fixed with the aid of a second clamping member 61 which engages a pair of clamping cheeks 63 and 64, whereas the completed bobbin remains free within the trough 10 until, after tearing of the thread between the clamping locations, the completed bobbin can be shifted out of the trough.

The sequence of operations during the coil exchange is thus as follows:

Stopping the full spool. Releasing the full spool. The spool then drops into trough 10. The spool 13 is then pushed to the rear by the pusher member 11. The yarn guard 6 and the yarn are entrained by the member 14. A new spool core is then inserted. The spool 13 and the yarn guard 8 are left in the position shown in FIG. 1. The pusher 11 is withdrawn. The spool core 9 is then started rotating, and the yarn is caught thereby.

In the embodiment according to FIG. 19 (spool 13 being clamped fast) there also occurs a stopping of the spool 13 by member 54 prior to the starting of coil core 9 to rotate. In the embodiment of FIG. 20 there is also a clamping fast of the yarn by the member 61, engaging the yarn in parts 63, 64. As a result of commencing of rotation of the spool core 9 while the yarn is so clamped, there occurs a tearing or severing of the yarn between the spindle head 1 and the full spool located in the trough 10. After the yarn coming from the yarn supply above has been wound one, two or three turns onto a new core 9, the severed end F is released and is flung outwardly due to centrifugal force and flutters as it is whipped about by the whip-lash action created by the rapidly rotating bobbin head. The subsequent turns become thus wound over the end F and hold it fast.

The mechanism for accomplishing the above according to FIG. 20 operates as follows.

FIG. 20 shows the motion of the clamping member 61 under the action of the control rod 12. As in the embodiment of FIG. 19, the clamping lever 61 may be fixedly mounted on a rigid shaft 61d which is pivotally journalled and on which the lever arm 61a is also fastened. However, it is again possible, as in FIG. 19, that the lever arm 61 and the lever arm 61a consist of a single unitary piece.

The free end or cam follower portion 61c of the lever arm 61a glides on the surface of the control rod 12 which is provided with a recess 116. The spring 61b pulls the clamping lever 61 toward the left in a counter clockwise direction about pivot axis 61d and thus presses the end 61c of lever arm 61a onto the upper surface of control rod 12. The position shown in FIG. 20 is the starting position at the beginning of a coil-exchanging operation. The control rod 12 is then moved toward the left so that the clamping effect on the yarn F between the clamping lever 61 and the parts 63, 64 is released, as shown in plan view in FIG. 20a. This clamping remains released until the control rod 12 again travels toward the right and has nearly reached its end limit position.

During this time that control rod 12 has moved to the left and back, a fully wound coil 13 has dropped into the trough 10 and has passed, in the previously described manner, toward the left to the illustrated position of FIG. 20. This has placed the yarn F between the parts 63, 64 on the one hand, and the end of the clamping lever 61 on the other hand. The manner in which this takes place is illustrated in plan view in FIG. 20a.

Figure 20A:
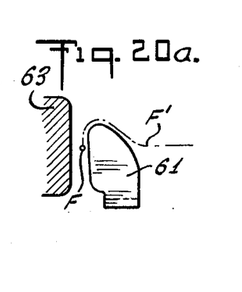
FIG. 20a is a fragmentary top view along line XXa—XXa of the device according to FIG. 20.

FIG. 20a shows in plan view a section or portion corresponding to the line XXa—XXa of FIG. 20. The part 63 is illustrated in section and the part 64 is located and spaced beneath it at the proper distance as shown in FIG. 20. Located to the right of these parts 63, 64 and clampingly cooperating therewith is the tip of the clamping lever 61 which has a contour as illustrated in FIG. 20a.

Due to the displacement of the wound cop 13 from the right to the left along trough 10, the yarn F is passed along the path F' illustrated as a dot-and-dash line in FIG. 20a and glides, due to its tension, between the parts 63, 61 on the one hand, and the clamping lever 61 on the other hand. Shortly before the control rod 12 reaches its right-hand limit position, the tip 61c of the lever arm 61a is moved into the recess 116 of the control rod 12, as shown in FIG. 20a. Consequently, the clamping lever 61 performs a pivotal motion counter clockwise toward the left and clamps the yarn F between the parts 63, 61 and 64.

Figure 22:
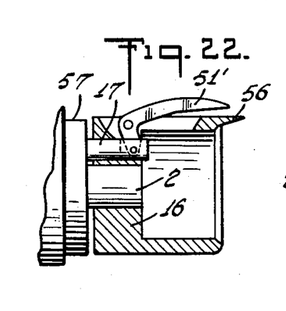
FIG. 22 shows a spindle head as used in the embodiments according to FIGS. 19 and 20, the clamping device of the spindle head being illustrated in the open position.
Figure 23:
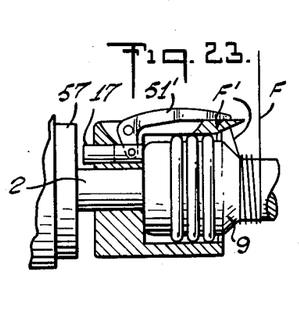
FIG. 23 shows the same spindle head with the clamping device in closed position.

Another embodiment of the clamping device is illustrated in FIGS. 22 and 23. As in the previous embodiments, the spindle head 1 mounted on the spindle shaft 2 moves from the left toward the right when an empty bobbin core is inserted, and an ejector pin 17 then moves toward the left out of the bottom of the spindle head. Connected with the ejector pin 17 is a clamping member 51'. As long as the ejector pin 17 protrudes toward the left out of the bottom of the spindle head 1, the clamping member 51' cooperates with a nose 56 on the spindle head facing the coil being wound. The clamping member 51' is then effective to pinch the thread end against the nose of the spindle head. This is apparent from FIG. 23. After the core body 9 is removed from the spindle head, the clamping member 51' turns upwardly while the ejector pin 17 is moving toward the right. Consequently, the previously clamped thread end F' is now released.

The actuation of the clamping member 51' by the seating of the bobbin core 9 in the spindle head 1, as described with reference to FIGS. 22 and 23, results in a simple design of reliable operation. However, such actuation need not necessarily or not exclusively be controlled by the bobbin core. It is also possible to apply for this purpose, aside from the axial displacement of the spindle shaft 2, an additional displacement of a closure member 57 as is also shown in FIGS. 22 and 23. The pin 17 can then be actuated by axial displacement of member 57 so that the nipping of the thread between the clamping member 51' and the nose 56 of the spindle head 1 can be effected at any desired moment, particularly after the spindle head has started running. It is therefore, also within the present invention to have the movable clamping member actuated by exterior control devices. In embodiments otherwise as shown in FIGS. 22 and 23, it is furthermore possible to utilize centrifugal force directly or indirectly for the actuation of one of the clamping members, in the manner described in conjunction with the preceding embodiments. In certain cases it is of advantage if the coupling between the actuating members, particularly at the clamping member proper, is not rigid but is given an elastic design or if one of these members itself is designed as a spring so that the clamping effect cannot possibly result in severing of the thread even if excessive forces are effective.

It has been found particularly advantageous to direct a current of air from the spindle head toward the thread end or tail to be found into the bobbin. This makes it certain that the tail will pass beneath the first few winding layers. According to another feature of the invention such a current of air is produced directly by the rotation of the spindle head. To this end, and as shown particularly in FIGS. 3 and 5, the spindle head 1 is equipped with impeller blades 151 and has one or more bores 152 which extend from the outside into the interior space of the spindle head. The air caught by the blades 151 passes through the bores 152 along the core head 27 onto the starting end of the winding. It is particularly important to provide a blade and a bore directly behind the clamping member 23. Instead of employing a current of air directed immediately upon the thread, an air current supplied from the outside may be passed indirectly upon the thread by guiding it in such a manner that only the reflected air current causes the yarn end to be blown against the winding being wound.

Figure 24:
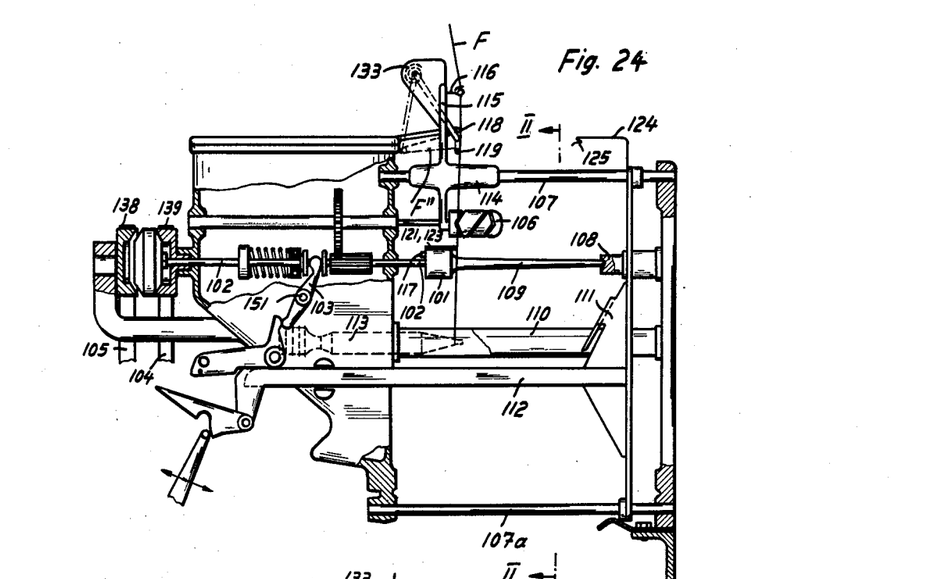
FIG. 24 illustrates schematically a front view generally similar to FIG. 1 but operating to form a loop of yarn ahead of the coiling location.
Figure 25:
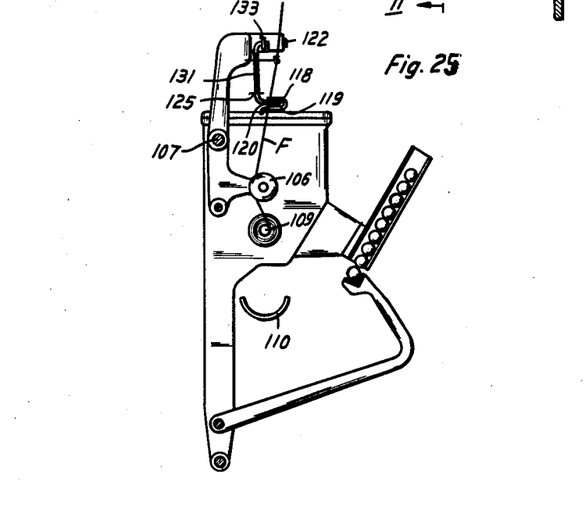
FIG. 25 shows a partial lateral view on a sectional plane denoted in FIG. 24 by (25)—(25).

The embodiment illustrated in FIGS. 24 and 25 is to a large extent similar to the one descirbed with reference to FIG. 1 but incorporates a further improvement by virture of which a loop of yarn is formed directly ahead of the winding location in order to reduce the stresses that may be imposed upon the yarn.

According to FIGS. 24 and 25, a spindle head 101 is mounted on a spindle shaft 102 normally coupled with the winder drive 104 by a clutch member 139 and engageable with the reversing drive 105 through a clutch member 138 under control by a control lever 103, all substantially as described with reference to the embodiment of FIG. 1. During coil changing operation, the spindle head 101 cooperates with a counter socket 108 in order to accommodate the bobbin core 109. Located below the spindle assembly is a trough 110 into which the completed bobbin 113 will drop as soon as the winding operation is completed and the coil changing operation has commenced. The full bobbin 113 is placed in the illustrated position by means of a pusher 111 mounted on a slidable control bar 112. During shifting movement of bar 112, the thread F places itself in front of clamping members 121, 123 and is seized by these members at the start of the next winding operation. Simultaneously with the full bobbin 113, the revolvable thread guide 106, slidable on the rod 107, is displaced into the left-hand position shown in FIG. 24. The thread guide 106 is mounted on a displaceable holder 114 which also possesses a carrier structure 115 on which a thread-guiding eye is mounted. The thread F passes through the eye. Located between the eye 116 and the thread guide 106 is a double bridge whose two bridge portions 118 and 119 are spaced from each other a distance of at least one centimeter.

The two bridge portions 118 and 119 straddle a hook 120 mounted on a swing arm 131. The swing arm 131 is pivoted at 122 and is biased by a spiral spring 133 which tends to rotate the arm 131 clockwise (FIG. 24) with only slight force. The incoming thread, after having passed through the eye 116, is so guided that the hook 120 in FIG. 25 remains at the right-hand side of the bridge portions 118 and 119. A pusher member 124 secured to the upper end of the pusher 111 cooperates with the swing arm 131 so that during coil changing operation the swing arm 131 is pushed toward the left. This happens as soon as the control bar 112 moves the pusher 111 toward the left and the end portion 125 of the pusher member 124 enters into engagement with the swing arm 131. During its movement the swing arm 131 pulls a loop F''. Thereafter the pusher member 124, upon completion of the coil change, again returns to the right into the illustrated position; but the swing arm 131 and hook 120, due to the force of spring 133, remain in the left-hand position shown by a dot-and-dash line. Hence, the hook 120 holds the loop of yarn F'' in the illustrated condition. When the winding on the empty bobbin core 109 is started, the amount of yarn stored in the loop is consumed first and results in at least one to two turns of yarn about the core body. However, the size of the loop is preferably so dimensioned that at least three to four turns about the core body are possible. During formation of these turns, the effect of the spring 133 prevents the yarn tension from increasing as abruptly as would be the case with a suddenly commencing starting of the operation so that the danger of damaging the yarn is correspondingly reduced.

The formation of a stored amount of thread ahead of the winding location proper, securely prevents the thread from becoming overloaded and torn at the commencing of the winding operation before it has reached the bobbin thus greatly improving the reliability of the coil starting performance. This makes it possible to wind such machines very fine and sensitive kinds of yarn without the danger of trouble.

The formation of a stored amount of yarn can also be secured by means of two bridge portions mounted on the eey carrier 115, between which bridge portions the pusher member 124 will directly enter to form the loop of yarn. In this case, the tautening of the yarn can be assigned to a thread guard of the known design which for this purpose is preferably given a larger range of swinging movement than usual.

Instead of mechanical tautening means, a current of air directed against the yarn may be used to operate by air pressure or suction in order to keep the yarn in taut condition.

As manifested by the various embodiments and modifications described in the foregoing, the invention permits of a variety of embodiments, and it will be understood by those skilled in the art that it may be incorporated in apparatus other than those particularly illustrated and described, without departing from the essence of the invention and within the scope of the claims annexed hereto.

I claim:

1. The method of starting a coil winding on a core carried by a rotating wind-up spindle, in yarn winding machines, which comprises fixing a yarn portion coming from a completed coil at a location near the spool head by clamping action on the completed coil, during the spool-charging procedure, resiliently radially clamping, in relation to the spindle axis, the starting yarn portion, intended for the replacement empty core, at a location turning with the spindle, tearing said yarn portion along its length leading from the completed coil while the spindle is turning in the winding-up operation, and terminating the clamping action so that it is released as soon as a few turns of yarn are located upon the replacement core and so that the released yarn end is wound beneath subsequently wound turns on said core.

2. The method of starting a coil winding on a core carried by a rotating wind-up spindle, in yarn winding machines, which comprises fixing a yarn portion coming from a completed coil at a location near the spool head, during the spool-changing procedure, resiliently radially clamping, in relation to the spindle axis, the starting yarn portion, intended for the replacement empty core, at a location turning with the spindle, tearing said yarn portion along its length leading from the completed coil while the spindle is turning in the winding-up operation, terminating the clamping action so that it is released as soon as a few turns of yarn are located upon the replacement core and so that the released yarn end is retained beneath subsequently wound turns on said core, and preventing the yarn from becoming overloaded and torn at the commencing of the winding operation by storing an amount of yarn in the form of a loop under tension before it has reached the core being wound up, the amount being sufficient for at least one turn about the core.

3. The method of starting a coil winding on a core carried by a rotating wind-up spindle, in yarn winding machines, which comprises resiliently radially clamping, in relation to the spindle axis, the starting yarn portion, intended for the replacement empty core, at a location turning with the spindle, during the spool-changing procedure, parting the yarn portion coming from the completed coil from the latter, when the spindle is in winding-up operation, and terminating the clamping action so that it is released as soon as a few turns of yarn are located upon the replacement core so that the released yarn end is retained beneath subsequent turns, and preventing the yarn from becoming overloaded and torn at the commencing of the winding operation by storing an amount of yarn in the form of a loop under tension before it has reached the core being wound up, the amount being sufficient for at least one turn about the core.

4. The method of starting a coil winding on a core carried by a rotating wind-up spindle, in yarn winding machines, which comprises resiliently radially clamping, in relation to the spindle axis, the starting yarn portion, intended for the replacement empty core, at a location turning with the spindle, during the spool-changing procedure, parting the yarn portion coming from the completed coil from the latter, when the spindle is in winding-up operation, and terminating the clamping action so that it is released as soon as a few turns of yarn are located upon the replacement core, the terminating of the clamping being energized by the application of centrifugal force of the rotating spindle at said location, the released yarn end being retained beneath subsequently wound turns, and preventing the yarn from becoming overloaded and torn at the commencing of the winding operation, by storing an amount of yarn in the form of a loop under tension before it has reached the core being wound up, the amount being sufficient for at least one turn about the core.

5. The method of starting a coil winding on a core carried by a rotating wind-up spindle, in yarn winding machines, which comprises resiliently radially clamping, in relation to the spindle axis, the starting yarn portion, intended for the replacement empty core, at a location turning with the spindle, during the spool-changing procedure wherein a completed coil is eliminated and said replacement core is inserted in said spindle for the next coil to be wound, parting said starting yarn portion from the yarn attached to the completed coil while the spindle is in winding-up operation, and terminating the clamping action by centrifugal force of the rotating spindle acting at said location so that said starting yarn portion is released to flutter by whiplash action caused by rotation of said replacement core as soon as a few turns of yarn are located upon the replacement core and so that the released yarn end is retained beneath subsequent turns of yarn on said replacement core.

6. Method according to claim 5, characterized in that the clamping of said starting yarn portion is effected only temporarily during the starting of rotation of said replacement core with said spindle to produce the coil next to be wound.

7. Method according to claim 5, characterized in that the termination of the clamping operation is followed by the discharge of the completed coil to be eliminated.

8. Method according to claim 5, characterized in that the clamping-yarn parting operation is preceded by a yarn displacing operation which is combined with the ejection of the previously completed coil and which occurs after releasing the completed coil from the winder spindle.

9. Method according to claim 5, characterized in that the clamping operation is terminated after the formation of a few windings so that the yarn end is released.

10. Method according to claim 5, characterized in that during coil changing operation but prior to the starting of the next coil there is formed a loop defining a stored amount of yarn betwen the yarn supply and said replacement core forming the coil next to be wound, the length of the stored amount of yarn corresponding to at least one to three turns about the core.

11. Method according to claim 10, characterized by the fact that the stored amount of yarn is held under a tension just sufficient for tautening the yarn.

12. The method of starting a coil winding on a core carried by a rotating wind-up spindle, in yarn winding machines, which comprises seizing and resiliently radially clamping, in relation to the spindle axis, the starting end of the yarn at a location fixed on the spindle, prior to bringing the spindle up to rated speed, thereafter accelerating the spindle rotation up to the normal winding speed, the seizing and clamping location rotating at the same angular velocity as the spindle and core, no pull being exerted by the said clamping on the yarn in the direction of the winding operation on the core, and automatically unclamping to release the yarn end when the rated operating speed of the spindle is reached so that the yarn end is held into and beneath subsequent turns wound onto said core.

13. The method of starting a coil winding on a rotating wind-up spindle in yarn winding machines, which comprises holding the starting portion of the yarn fixedly clamped on the rotating spindle prior to commencing the winding of the yarn on said spindle, then commencing and accelerating the spindle rotation up to the normal winding speed, and automatically resiliently radially unclamping the starting portion of the yarn, in relation to the spindle axis, to release it after a first few turns are wound, at a moment not later than the end of the accelerating interval, the starting portion being parted from a preceding coil winding after said release so that the parted yarn end is wound into and beneath subsequent yarn turns wound onto said core.

14. In the method according to claim 12, the step of resiliently radially releasing, in relation to the spindle axis, the yarn end taking place when a predetermined winding speed, lower than said normal speed, is reached.

15. The method of starting a yarn-coil winding operation on a rotating wind-up spindle after completion of the next preceding winding operation thereon, which comprises holding the yarn end, parted from the coil precedingly completed, stationarily clamped at a fixed location, clamping the yarn at another location which rotates at the same angular velocity and about the same axis as the spindle, then accelerating the winding operation up to the normal winding speed, the yarn end being withdrawn from said fixed location at the start of the accelerating interval, and thereafter releasing the yarn end from the second location after a number of initial turns are wound so that the yarn end is placed into and beneath subsequent yarn turns wound.

16. In the method according to claim 12, the step of releasing the yarn end being performed upon reaching a predetermined acceleration of the commencing winding operation.

17. The method according to claim 12, wherein said holding of the starting end of the yarn is effected with a holding force greater than the tearing strength of the yarn to tear it from the preceding coil winding.

18. The method of starting a coil winding on a core carried by a rotating wind-up spindle, in yarn winding machines, which comprises automatically seizing and resiliently radially clamping, in relation to the spindle axis, the starting end of the yarn at a location fixed on the spindle, prior to bringing the spindle up to rated speed, thereafter accelerating the spindle rotation up to the normal winding speed, the seizing and clamping location rotating at the same angular velocity as the spindle and core, and automatically unclamping to release the yarn end when the rated operating speed of the spindle is reached, the automatic unclamping being energized by the application of centrifugal force of the rotating spindle at said location so that the released yarn end is wound into and beneath subsequent yarn turns wound on the core.

19. The method of starting a coil winding on a core carried by a rotating wind-up spindle, in yarn winding machines, which comprises automatically seizing and resiliently radially clamping, in relation to the spindle axis, the starting end of the yarn at a location fixed on the spindle, prior to bringing the spindle up to rated speed, thereafter accelerating the spindle rotation up to the normal winding speed, the seizing and clamping location rotating at the same angular velocity as the spindle and core, and automatically unclamping to release the yarn end at a moment not later than when the rated operating speed of the spindle is reached, the starting portion being parted from a preceding coil winding not later than said release, the automatic unclamping being energized by the application of centrifugal force of the rotating spindle at said location so that the yarn end is wound into and beneath subsequent yarn turns wound on said core.

20. The method of starting a yarn-coil winding operation on a rotating wind-up spindle after completion of the next preceding winding operation thereon, which comprises first severing the yarn from the coil precedingly completed and holding the severed yarn end stationarily clamped at a fixed location, then clamping the yarn at another location which is on the spindle and is in fixed relation to the new coil to be wound, then commencing and accelerating the winding operation up to the normal winding speed, the yarn end being withdrawn from said first mentioned fixed location at the start of the accelerating interval, and thereafter releasing the yarn end from the second location after a number of initial turns are wound so that the yarn end being placed into and beneath subsequently wound yarn turns.

21. In a yarn-coil winding machine, a device for starting a coil winding operation after completion of the preceding coil and for parting the yarn from the completed coil, comprising a revolvable spindle having a spindle head and means for entraining a coil core, a thread guide defining a path for the yarn to be wound onto the core, a yarn clamping device mounted on and rotating at the same angular velocity as said spindle head and having a radially displaceable portion engageable with the yarn coming from said guide and mounted for displacement thereof relative to said spindle head between yarn clamping and yarn releasing positions, and automatic control means connected with said clamping device for radially displacing said portion to clamp the yarn end during the starting interval of said spindle head and to subsequently release the yarn end.

22. In a yarn-coil winding machine, a device for starting a coil winding operation after completion of the preceding coil and for parting the yarn from the completed coil, comprising a revolvable spindle head having means for entraining a coil core, a yarn clamping device mounted on and rotating at the same angular velocity as said spindle head and having a radially displaceable clamping portion engageable with the yarn coming from said guide, said portion being radially displaceable between yarn clamping and yarn releasing positions, said portion of the clamping device clamping the yarn end during the starting interval of said spindle head and being subsequently released from the yarn end, the yarn end when released, and after parting, being wound into and beneath subsequent yarn turns wound onto the core, said release being actuated by application of centrifugal force of the rotating spindle at said location.

23. In a yarn-coil winding machine, a device for starting a coil winding operation after completion of the preceding coil, comprising a revolvable spindle head having means for entraining a coil core, a yarn spring clamping device mounted on and rotating at the same angular velocity as said spindle head and having a radially displaceable clamping portion engageable with the yarn coming from said guide, said portion being radially displaceable between yarn clamping and yarn releasing positions, said portion of the spring clamping device clamping the yarn end during the starting interval of said spindle head and being subsequently released from the yarn end, the yarn end when released being wound into and beneath subsequent yarn turns wound onto the core, and weight means attached to said portion of the spring clamping device to pull said portion outwardly by centrifugal force to effect said yarn end release.

24. The apparatus defined in claim 22, the spindle head being axially displaceable, to carry out the winding operation and to remove power from the latter, the yarn clamping device comprising a weighted resilient member having said clamping portion normally pressing in the direction toward the spindle head, said member being mounted for axial movement, and yarn severing means comprising a cutter blade and a cutter counter blade mounted for axial movement between the resilient member and the spindle head, means for controlling the cutting operation in dependence upon the axial displacement of the spindle head so that, immediately subsequent to the cutting of the yarn, the end of the yarn leading to the core being wound is clamped.

25. In a yarn-coil winding machine, a device for starting a coil winding operation after completion of the precedingly wound coil, comprising a revolvable spindle head having means for entraining a coil core, a thread guide defining a path for the yarn to be wound onto the core, a yarn clamping device having a yarn clamping member mounted on said spindle head and having a clamping portion engageable with said head for clamping the starting end of the yarn during coil starting operation, said member being resiliently pressed inwardly toward the spindle head and being movable by centrifugal force radially away from the clamping position when said spindle head accelerates to a given speed during said starting operation so that the yarn end when released is wound into and beneath yarn turns subsequently wound onto the core.

26. In a yarn-coil winding machine, a device for starting a coil winding operation after completion of the preceding coil and for parting the yarn from the completed coil, comprising a revolvable spindle having a spindle head and means for entraining a coil core, a thread guide defining a path for the yarn to be wound onto the core, a yarn clamping device mounted on and rotating at the same angular velocity as said spindle head and having a radially displaceable portion engageable with the yarn coming from said guide, said portion being radially displaceable between yarn clamping and yarn releasing positions, and automatic control means connected with said clamping device for causing said portion to clamp the yarn end during the starting interval of said spindle head and to subsequently release the yarn end so that the yarn end when released, and after parting, is wound into and beneath subsequent yarn turns wound onto the core, means for releasing the completed coil from the spindle, means for receiving the completed coil from the spindle, means for temporarily arresting the yarn attached to the received completed coil parting the yarn in cooperation with said clamping device and for releasing the said clamping directly after the parting of the yarn.

27. In a coil winding machine having a winder head for revolving a core of a coil to be wound and having coil changing means for replacing a completed coil by an empty core, in combination, a coil starting device comprising yarn clamping means and yarn severing means, said device being located near said winder head and being engageable by the yarn, means operable in accordance with the position of the winder head for clamping the starting end of the coil to be wound and simultaneously parting the yarn end of the completed coil, and means for arresting the yarn attached to the completed coil after said completed coil has been released from said winder head so as to part the yarn in cooperation with said clamping means.

28. Device according to claim 21, including yarn guiding means for inserting the yarn into the clamping means.

29. Device according to claim 21, characterized by the fact that yarn severing means is provided, rotatable together with the spindle head, and that arresting means are provided which become effective when the spindle drive is switched off and which hold the clamping-severing means in a predetermined position until the yarn is guided into the device.

30. Device according to claim 29, characterized in that the clamping-severing means is actuated by the seating movement of the new coil core entering into the spindle head.

31. Device according to claim 30, characterized in that the operation of the clamping means is rendered ineffective by centrifugal force caused by the rotation of the spindle head.

32. Device according to claim 29, characterized in that the clamping and severing means are mounted on the winder head and that they are adjustable to a given position during coil changing operation, relative to the rotation of the winder spindle.

33. Device according to claim 29, characterized in that the yarn is caused to bear against a sharp edge during relative movement between the two clamping devices, the edge being located in the vicinity of said clamping devices.

34. Device according to claim 21, characterized in that a loop-forming device acting during coil changing operation and a tensioning device for applying slight tension to this loop are provided at the coiling location.

35. Device according to claim 34, characterized in that the loop-forming device comprises two bridge members and a pusher member cooperating with said bridge members and entering between them to form the loop.

References Cited in the file of this patent

UNITED STATES PATENTS 2,718,360    Joyce  ---------------- Sept. 20, 1955